(12) United States Patent
Wen (10) Patent No.: US 7,206,802 B2
(45) Date of Patent: Apr. 17, 2007

(54) HYBRID CARRY LOOK AHEAD/CARRY SELECT ADDER INCLUDING CARRY LOGIC GENERATING COMPLEMENTARY HOT CARRY SIGNALS, AND METHOD FOR PRODUCING THE CARRY LOGIC

(75) Inventor: Huajun Wen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 10/268,233

(22) Filed: Oct. 10, 2002

(65) Prior Publication Data

US 2004/0073593 A1 Apr. 15, 2004

(51) Int. Cl.
*G06F 7/50* (2006.01)

(52) U.S. Cl. .................................................. 708/710
(58) Field of Classification Search ......... 708/700–714
See application file for complete search history.

(56) References Cited

U.S. PATENT DOCUMENTS 5,257,218 A * 10/1993 Poon ........................... 708/712
5,375,081 A * 12/1994 Anderson .................... 708/712
5,508,952 A    4/1996 Kantabutra
6,782,406 B2 * 8/2004 Koshy ......................... 708/710
6,789,099 B2 * 9/2004 Kim et al. ................... 708/710
6,839,729 B2 * 1/2005 Pham .......................... 708/710

OTHER PUBLICATIONS

Kyung-Nam et al., A New Adder Scheme with Reduced P, G Signal Generations using Redundant Binary Number System, IEEE International Symposium on Circuits and Systems, May 28-31, 2000.*

* cited by examiner

*Primary Examiner*—Meng-Al T. An
*Assistant Examiner*—Chat C. Do
(74) *Attorney, Agent, or Firm*—Carr LLP; D'Ann Rifai (57) ABSTRACT

A binary adder circuit including a carry logic circuit and selection logic. The carry logic circuit uses group generate and propagate signals to produce complementary carry signals. The selection logic produces one of two presums dependent on the complementary carry signals. In a method for producing a carry logic circuit, a group generate logic function $G_{I,\ I+1} = G_I$ OR $G_{I+1}$ AND $P_I$ is to be performed. When $G_{I+1} = C_{I+1}$, $G_{I,\ I+1} = C_I$, arrival times of generate signals $G_I$ and $G_{I+1}$, are investigated. If $G_I$ arrives before $G_{I+1}$, a complex AND-OR-INVERT gate is used, otherwise a cascaded pair of NAND gates is selected. To produce a complementary carry signal, a logic function $G_{I,\ I+1}' = G_I'$ AND $G_{I+1}'$ OR $P_I'$ is to be performed. If the generate signal $G_I'$ arrives before $G_{I+1}'$, a complex OR-AND-INVERT gate is used, otherwise a cascaded pair of NOR gates is selected.

15 Claims, 6 Drawing Sheets

HYBRID CARRY LOOK AHEAD/CARRY SELECT ADDER INCLUDING CARRY LOGIC GENERATING COMPLEMENTARY HOT CARRY SIGNALS, AND METHOD FOR PRODUCING THE CARRY LOGIC

TECHNICAL FIELD

This invention relates generally to binary adder circuits and, more particularly, to fast binary adder circuits used in digital processors.

BACKGROUND OF THE INVENTION

Modern processors (e.g., microprocessors) typically include several binary adder circuits (i.e., "adders"). For example, one adder is typically used in an integer arithmetic logic unit (ALU) for performing addition, subtraction, multiplication, and division. A floating-point processor may include two adders: one for processing the mantissa, and another for processing the exponents. Additional adders may be used to compute relative addresses for memory access and branch instructions.

In many processor designs, the speed of the processor is limited by the time required to perform an addition operation in the ALU. In general, binary adders are performance-critical components of modern processors. Further, as processor clock signal frequencies increase and periods decrease, implementing "wide" adders (e.g., 64-bit adders) capable of producing sums and carry signals during single cycles of processor clock signals becomes increasingly difficult.

Although adders implemented in dynamic logic may compute sums and carry signals faster than static logic implementations, static logic implementations are still desirable due to the typical higher power consumption and the increased susceptibility to noise of dynamic logic circuits.

The multiplicity of "fast" static adder designs includes carry look ahead adders and carry select adders. In a typical carry look ahead adder, an addend A and an augend B are divided into multiple sections or "blocks" $A_I$ and $B_I$. In general, bits within each block, and a carry from a previous block (e.g., a carry in), are added to form a sum and a carry out for the block. Generate signals $G_I$ and propagate signals $P_I$ are computed for each block, and logically combined to compute the carry out:

$P_I = A_I + B_I$ where '+' represents logical OR (or alternately PI=AI XOR BI)

$G_I = A_I \cdot B_I$ where '·' represents logical AND

Carry In=$C_{I+1}$ (where lower numbered bits are more significant)

Carry Out=$C_I = G_I + P_I \cdot C_{I+1}$ (where lower numbered bits are more significant)

Sum=$A_I$ XOR $B_I$ XOR $C_I$ (or Sum=$P_I$ XOR $C_I$ where $P_I = A_I$ XOR $B_I$)

The carry look ahead technique saves time by allowing carry signal computations to be overlapped (i.e., by allowing the carry signals to be computed substantially in parallel).

Carry select adders are also popular choices due to their relatively small gate fanouts (numbers of gate inputs driven by each gate output) and relatively small numbers of gate stages compared with other static adder implementations (e.g., carry look ahead adders). In a typical carry select adder, as in the typical carry look ahead adder, an addend A and an augend B are divided into multiple sections or blocks. In general, bits within each block, and a carry from a previous block (e.g., a carry in), are added to form a sum and a carry out for the block.

Unlike the carry look ahead adder, the carry select adder performs two separate addition operations for each block: one with a carry in (i.e., an assumed carry in) of '0', and the other with a carry in (i.e., an assumed carry in) of '1'. The results of the two addition operations are called "presums" and are typically provided to inputs of a multiplexer. The carry out produced by the previous block is used to control the multiplexer such that the multiplexer selects the correct presum. The carry out produced by the previous block also determines the carry out produced by the current block. The carry select technique saves time by computing all possible presums, then selecting from among the presums dependent upon the actual carry signals.

As processor clock signal frequencies continue to increase, a continuing need exists for adders capable of producing sums and carry signals in shorter periods of time.

SUMMARY OF THE INVENTION

A binary adder circuit is disclosed including a carry logic circuit coupled to selection logic. The carry logic circuit receives a group generate signal and a group propagate signal and produces a pair of complementary carry signals dependent upon the group generate signal and the group propagate signal. The selection logic receives a first presum, a second presum, and the pair of complementary carry signals, and produces either the first presum or the second presum dependent upon the pair of complementary carry signals.

Methods are disclosed for producing a carry logic circuit for use in an adder circuit. The methods involve performing several operations at each position along a critical timing path of the carry logic circuit. In one method, a group generate logic function $G_{I,\,I+1} = G_I$ OR $G_{I+1}$ AND $P_I$ is to be performed, where $G_I$ and $G_{I+1}$ are generate signals and $P_I$ is a propagate signal. When $G_{I+1} = C_{I+1}$, then $G_{I,\,I+1} = C_I$, and arrival times of the generate signals $G_I$ and $G_{I+1}$ are investigated. If the generate signal $G_I$ arrives earlier than the generate signal $G_{I+1}$, a complex AND-OR-INVERT gate is selected to perform the group generate logic function. On the other hand, if the generate signal $G_{I+1}$ arrives earlier than the generate signal $G_I$, a cascaded pair of NAND gates is selected to perform the group generate logic function.

In another method, a group generate logic function $G_{I,\,I+1}' = G_I'$ AND $G_{I+1}'$ OR $P_I'$ is to be performed, where $G_I'$ and $G_{I+1}'$ are generate signals and $P_I'$ is a propagate signal. The arrival times of the generate signals $G_I'$ and $G_{I+1}'$ are investigated. If the generate signal $G_I'$ arrives earlier than the generate signal $G_{I+1}'$, a complex OR-AND-INVERT gate is selected to perform the group generate logic function. On the other hand, if the generate signal $G_{I+1}'$ arrives earlier than the generate signal $G_I'$, a cascaded pair of NOR gates is selected to perform the group generate logic function.

BRIEF DESCRIPTION OF THE DRAWINGS

The invention may be understood by reference to the following description taken in conjunction with the accompanying drawings, in which like reference numerals identify similar elements, and in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
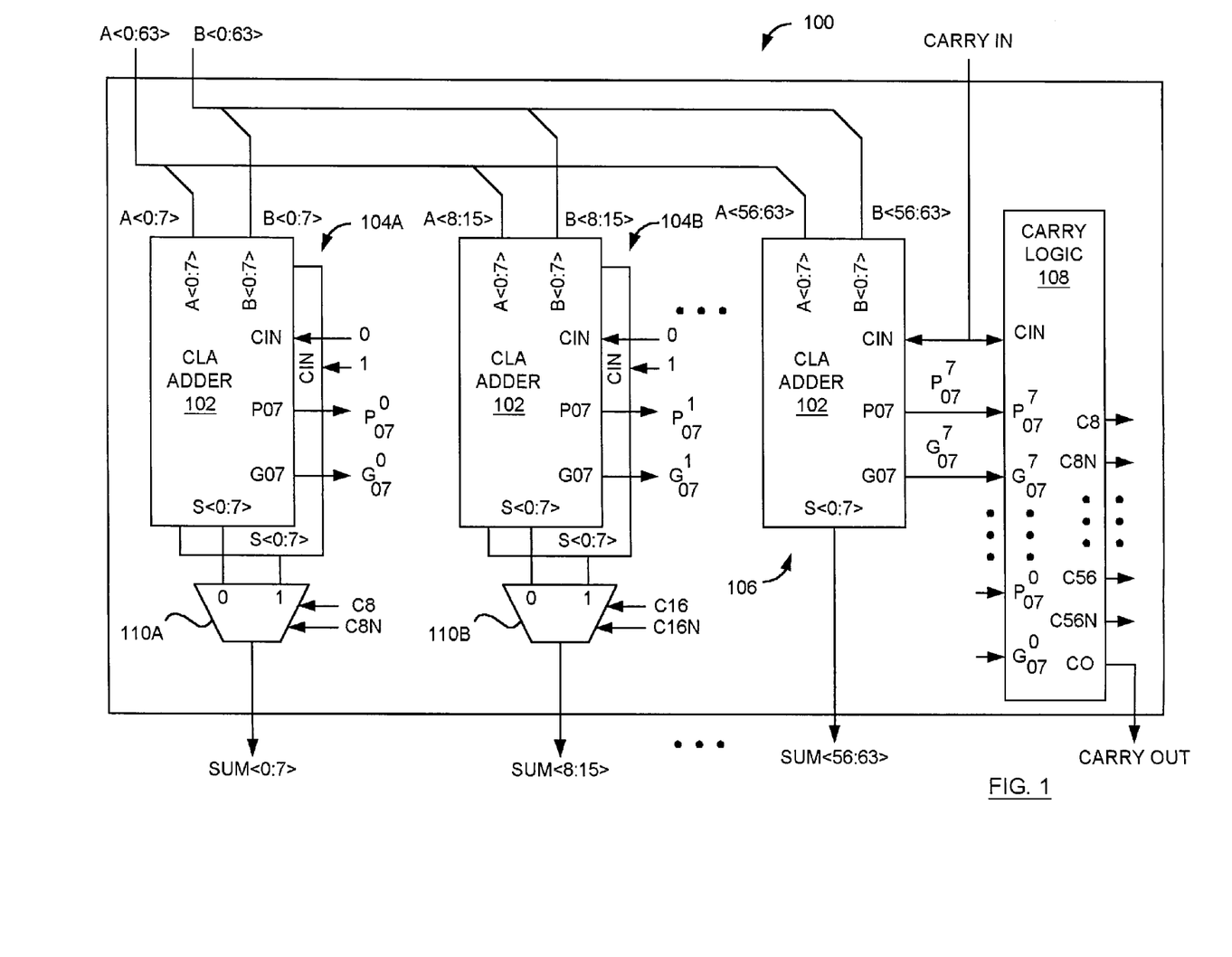
FIG. 1 is a diagram of one embodiment of a 64-bit binary adder circuit including multiple carry look ahead (CLA) adder circuits and structures typical of carry select adder circuits.

FIG. 1 is a diagram of one embodiment of a 64-bit binary adder circuit 100 including both carry look ahead (CLA) structures and carry select structures. Adder circuit 100 receives a 64-bit binary addend A<0:63>, a 64-bit binary augend B<0:63>, and a CARRY IN signal, and produces a 64-bit binary sum SUM<0:63> and a CARRY OUT signal such that:

SUM<0:63>=A<0:63>+B<0:63>+CARRY IN ('+' represents addition) and the CARRY OUT signal is set if the addition operation produces a carry.

It is noted that in the ordered bit representations described herein, a <0> bit is the most significant bit, and the highest numbered bit (e.g., bit <63>) is the least significant bit. For example, the decimal value represented by the 64-bit binary addend A<0:63> is equal to $(A<0>\cdot 2^{63})+(A<1>\cdot 2^{62}) + \ldots +(A<63>\cdot 2^{0})$, where '+' represents addition and '·' represents multiplication.

In the embodiment of FIG. 1, the 64-bit adder circuit 100 includes fifteen substantially identical versions of an 8-bit carry look ahead (CLA) adder circuit 102. Fourteen of the CLA adder circuits 102 are arranged to form seven pairs of CLA adder circuits. To simplify FIG. 1, only two of the pairs (labeled 104A and 104B) are shown in FIG. 1. The fifteenth CLA adder circuit operates alone, and is labeled 106 in FIG. 1. The seven pairs of CLA adder circuits receive the seven most significant 8-bit portions (i.e., "slices") of the addend A<0:63> and the augend B<0:63>, and the lone CLA adder circuit 106 receives the eighth, and least significant 8-bit slice of the addend A<0:63> and the augend B<0:63>.

In the pair 104A, each of the CLA adder circuits 102 receives A<0:7> and B<0:7> and a carry in signal CIN, and produces a presum S<0:7>, where S<0:7>=A<0:7>+B<0:7>+CIN ('+' represents addition). In CLA fashion, one of the CLA adder circuits 102 of the pair 104A also produces a propagate signal $P_{07}^{0}$ and a generate signal $G_{07}^{0}$. (The other CLA adder circuit 102 of the pair 104A may also produce the propagate signal $P_{07}^{0}$ and the generate signal $G_{07}^{0}$, but only one of the CLA adder circuits 102 of the pair 104A need generate the propagate signal $P_{07}^{0}$ and the generate signal $G_{07}^{0}$). As described in more detail below, the carry logic 108 receives the propagate signal $P_{07}^{0}$ and the generate signal $G_{07}^{0}$, and uses the $P_{07}^{0}$ and $G_{07}^{0}$ signals to produce the CARRY OUT signal.

In carry select fashion, the carry in signal CIN to one of the CLA adder circuits 102 of the pair 104A is a '0', and the carry in signal CIN to the other CLA adder circuit 102 is a '1'. Both of the CLA adder circuits 102 provide their presums S<0:7> to inputs of a multiplexer 110A. The multiplexer 110A receives complementary carry signals (i.e., "hot" carry signals) C8 and C8N, where C8N=C8', uses the complementary hot carry signals C8 and C8N to select one of the presums S<0:7> produced by the CLA adder circuits 102 of the pair 104A, and produces the selected presum S<0:7> as SUM<0:7> for the adder circuit 100.

Similarly, in the pair 104B, each of the CLA adder circuits 102 receives A<8:15> of the addend as A<0:7>, B<8:15> of the augend as B<0:7>, and a carry in signal CIN, and produces a presum S<0:7>, where S<0:7>=A<0:7>+B<0:7>+CIN ('+' represents addition). In CLA fashion, one of the CLA adder circuits 102 of the pair 104B also produces a propagate signal $P_{07}^{1}$ and a generate signal $G_{07}^{1}$. As described in more detail below, the carry logic 108 receives the propagate signal $P_{07}^{1}$ and the generate signal $G_{07}^{1}$, and uses the $P_{07}^{1}$ and $G_{07}^{1}$ signals to produce the complementary hot carry signals C8 and C8N.

In carry select fashion, the carry in signal CIN to one of the CLA adder circuits 102 of the pair 104B is a '0', and the carry in signal CIN to the other CLA adder circuit 102 is a '1'. Both of the CLA adder circuits 102 of the pair 104B provide their presums S<0:7> to inputs of a multiplexer 110B. The multiplexer 110B receives complementary hot carry signals C16 and C16N, where C16N=C16', uses the complementary hot carry signals C16 and C16N to select one of the presums S<0:7> produced by the CLA adder circuits 102 of the pair 104B, and produces the selected presum S<0:7> as SUM<8:15> for the adder circuit 100.

The CLA adder circuit 106 receives A<56:63> of the addend as A<0:7>, B<56:63> of the augend as B<0:7>, and the CARRY IN signal to the adder circuit 100 as a carry in signal CIN, and produces a (final) sum S<0:7>, where S<0:7>=A<0:7>+B<0:7>+CIN ('+' represents addition). As indicated in FIG. 1, the sum S<0:7> produced by the CLA adder circuit 106 becomes SUM <56:63> for the adder circuit 100. The CLA adder circuit 106 also produces a propagate signal $P_{07}^{7}$ and a generate signal $G_{07}^{7}$. As described in more detail below, the carry logic 108 receives the propagate signal $P_{07}^{7}$ and the generate signal $G_{07}^{7}$, and uses the $P_{07}^{7}$ and $G_{07}^{7}$ signals to produce complementary hot carry signals C56 and C56N.

The carry logic 108 receives the CARRY IN signal to the adder circuit 100, the seven $p_{07}^{K}$ signals produced by the seven pairs of CLA adder circuits ($0 \leq K \leq 6$), and the $P_{07}^{7}$ and $G_{07}^{7}$ signals produced by the CLA adder circuit 106, and uses the CARRY IN signal and the propagate and generate signals to produce complementary hot carry signals C8 and C8N, C16 and C16N, C24 and C24N, C32 and C32N, C40 and C40N, C48 and C48N, and C56 and C56N, where:

$C8 = G_{07}^{1} + P_{07}^{1} \cdot C16$, where '+' represents logical OR and '·' represents logical AND, $C16 = G_{07}^{2} + P_{07}^{2} \cdot C24$, $C24 = G_{07}^3 + P_{07}^3 \cdot C32,$ $C32 = G_{07}^4 + P_{07}^4 \cdot C40,$ $C40 = G_{07}^5 + P_{07}^5 \cdot C48,$ $C48 = G_{07}^6 + P_{07}^6 \cdot C56,$ and $C56 = G_{07}^7 + P_{07}^7 \cdot CIN.$ The carry logic 108 also uses the CARRY IN signal and the propagate and generate signals to generate a carry out signal CO, and produces the CO signal as the CARRY OUT signal of the adder circuit 100:

CARRY OUT = $CO = G_{07}^0 + P_{07}^0 \cdot C8$ ('+'=OR, '·'=AND)

Figure 2:
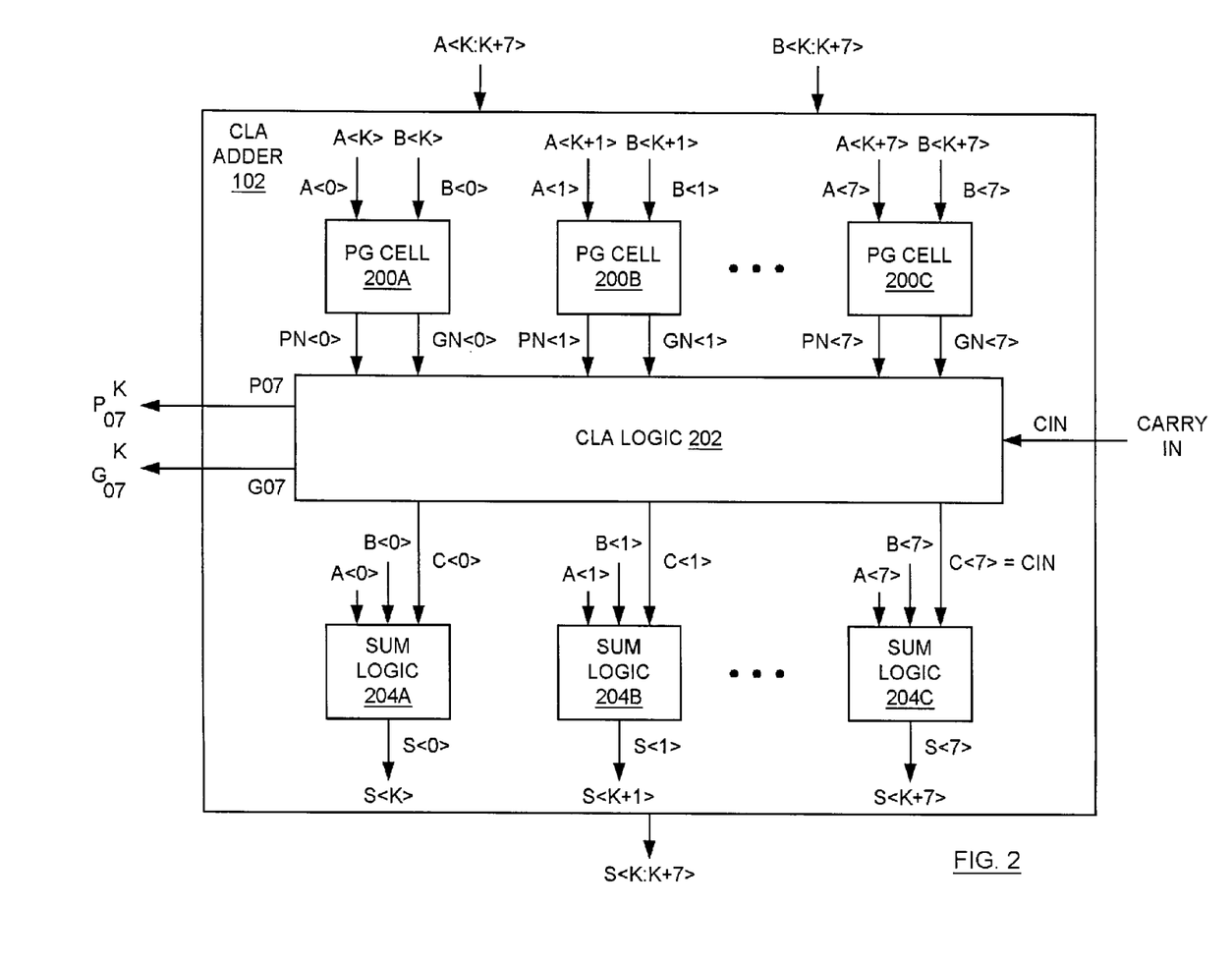
FIG. 2 is a diagram of one embodiment of a representative one of the CLA adder circuits of FIG. 1, wherein the representative one of the CLA adder circuits includes CLA logic.

FIG. 2 is a diagram of one embodiment of the CLA adder circuit 102 of FIG. 1. In the embodiment of FIG. 2, the CLA adder circuit 102 includes eight propagate-generate (PG) cells. To simplify FIG. 2, only three of the eight PG cells (labeled 200A–200C) are shown in FIG. 2. The CLA adder circuit 102 also includes a CLA logic unit 202 and eight sum logic units. To simplify FIG. 2, only three of the eight sum logic units (labeled 204A–204C) are shown in FIG. 2. As indicated in FIG. 2, the CLA adder circuit 102 receives an 8-bit portion (i.e., "slice") A<K:K+7> of the addend (K=0, 8, ..., 56), a corresponding 8-bit slice B<K:K+7> of the augend, and a carry in signal CIN, and produces an 8-bit sum (presum or final sum) S<K:K+7> such that:

S<K:K+7> = A<K:K+7> + B<K:K+7> + CIN ('+' represents addition)

As indicated in FIG. 2, each of the PG cells 200 receives a corresponding bit A<M> of A<K:K+7>, where (0<M<7), and a corresponding bit B<M> of B<K:K+7>, produces an inverted propagate signal PN<M> and an inverted generate signal GN<M> such that:

PN<M> = A<M> NOR B<M>, and

GN<M> = A<M> NAND B<M>.

It is noted that since PN<M>=P<M>' and GN<M>=G<M>':

P<M> = A<M> OR B<M>, and

G<M> = A<M> AND B<M>.

and that, in other embodiments, each of the PG cells 200 may also produce the propagate signal P<M> and the generate signal G<M> such that:

P<M> = A<M> OR B<M>, and

G<M> = A<M> AND B<M>.

The CLA logic unit 202 receives the inverted propagate signals PN<M> and the inverted generate signals GN<M> produced by the eight PG cells 200 and a carry in signal CIN, and produces carry signals C<0> through C<7> such that:

C<7> = CIN, and

C<M> = G<M> + P<M>·C<M+1>, where 0≦M≦6, G<M>=GN<M>', P<M>=PN<M>', '+'=OR, and '·'=AND.

The CLA logic unit 202 also produces a propagate signal $P_{07}^{K/8}$ and a generate signal $G_{07}^{K/8}$ where:

$P_{07}^{K/8}$ = P<0>·P<1>·P<2>·P<3>·P<4>·P<5>·P<6>·P<7>, where P<N>=PN<N>' and '·'=AND, and $G_{07}^{K/8}$ = G<0>+G<1>·P<0>+G<2>·P<1>·P<0>+
G<3>·P<2>·P<1>·P<0>+
G<4>·P<3>·P<2>·P<1>·P<0>+
G<5>·P<4>·P<3>·P<2>·P<1>·P<0>+
G<6>·P<5>·P<4>·P<3>·P<2>·P<1>·P<0>+
G<7>·P<6>·P<5>·P<4>·P<3>·P<2>·P<1>·P<0>,
where G<N>=GN<N>', P<N>=PN<N>', '+'=OR, and '·'=AND.

Each of the sum logic units 204 receives a corresponding bit A<M> of A<K:K+7>, where (0≦M≦7), a corresponding bit B<M> of B<K:K+7>, and the corresponding carry signal C<M> from the carry logic unit 202, produces a sum bit (presum bit or final sum bit) S<M> such that:

S<M> = A<M> XOR B<M> XOR C<M>, where XOR represents logical exclusive OR

Figure 3:
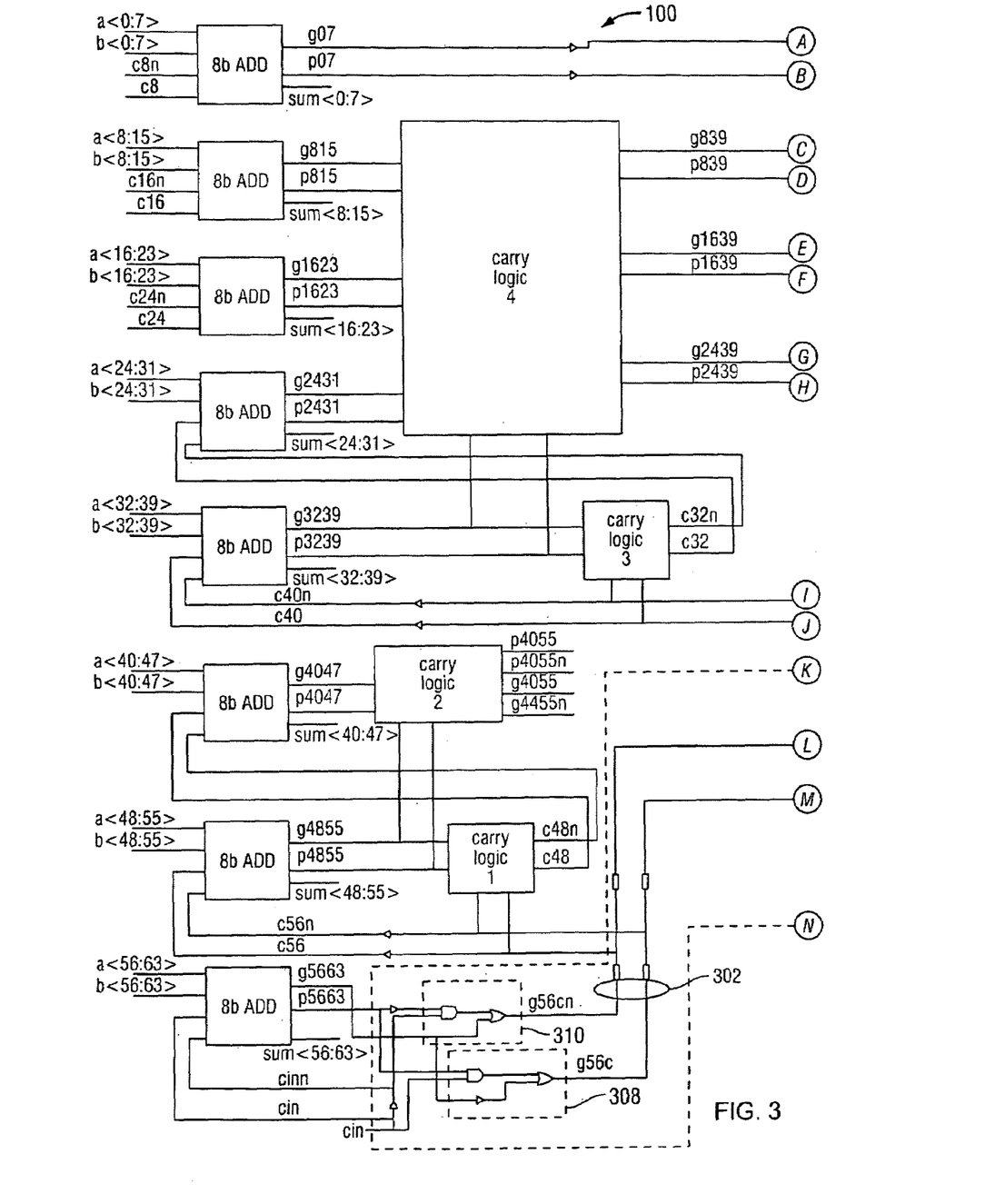
FIG. 3 is a diagram of one embodiment of the 64-bit adder circuit of FIG. 1.

FIG. 3 is a diagram of one embodiment of the 64-bit adder circuit 100 of FIG. 1. In the embodiment of FIG. 3, an 8-bit adder circuit labeled "8b ADD" and receiving A<56:63> and B<56:63> represents the CLA adder circuit 106 of FIG. 1. The other seven 8-bit adder circuits labeled "8b ADD" in FIG. 3 each include a pair of CLA adder circuits 104 of FIG. 1 and the corresponding multiplexer 110 of FIG. 1.

The carry logic 108 of FIG. 1 is distributed among four carry logic units labeled "carry logic 1," "carry logic 2," "carry logic 3," and "carry logic 4" in FIG. 3, and a section labeled 300 including several logic gates. The logic gates within the carry logic units "carry logic 1," "carry logic 2," "carry logic 3," and "carry logic 4" are not shown to simplify FIG. 3. As indicated in FIG. 3 and described above, the complementary hot carry signals C8 and C8N, C16 and C16N, C24 and C24N, C32 and C32N, C40 and C40N, C48 and C48N, and C56 and C56N, are generated by the distributed carry logic and used to select between presums generated by the CLA adder circuits in carry-select fashion. In general, the adder circuit 100 of FIGS. 1 and 3 include dual hot carry networks providing complementary hot carry signals.

In general, within the carry logic units "carry logic 1," "carry logic 2," "carry logic 3," and "carry logic 4," and the section labeled 302, propagate signals $P_I$ and $P_{I+1}$ and generate signals $G_I$ and $G_{I+1}$ are logically combined several times such that:

$P_{I, I+1} = P_I \cdot P_{I+1}$ ('·' represents logical AND)

$G_{I, I+1} = G_I + G_{I+1} \cdot P_I$ ('+' represents logical OR and '·' represents logical AND)

Herein below, the logic function $P_{I, I+1} = P_I \cdot P_{I+1}$ will be referred to as a "group propagate logic function," and the logic function $G_{I, I+1} = G_I + G_{I+1} \cdot P_I$ will be referred to as a "group generate logic function."

Several of the complementary hot carry signals are generated within the section 300, and a critical timing path (i.e., "critical path") of the adder circuit 100 resides substantially within the section 300. In the embodiment of FIG. 3, the carry logic includes multiple pairs of signal lines 302 within the section 300 and positioned along the critical path of the adder circuit 100. Each of the pairs of signal lines 302 is used to convey complementary hot carry signals within the section 300.

The logic gates used to carry out the logic functions within the section 300 have been analyzed and optimized with regard to timing such that the adder circuit produces the 64-bit sum SUM<0:63> and the CARRY OUT signal in less time. Specifically, the section 300 has been formed by carefully selecting between complex complementary metal oxide semiconductor (CMOS) AND-OR-INVERT (AOI) gates and OR-AND-INVERT (OAI), and NAND/NOR gate combinations, to perform carry logic functions. In general, where a carry logic function is to be performed, a complex AOI/OAI gate or a NAND/NOR gate combination is selected based on signal arrival times.

Within the section 300 of FIG. 3, the following logic operations are performed at several locations along the critical path of the carry logic circuit of the adder circuit 100:

$$G_{I,\,I+1} = G_I + G_{I+1} \cdot P_I \text{ ('+' represents logical OR and '·' represents logical AND),}$$

and $$G_{I,\,I+1}' = G_I' \cdot G_{I+1}' + P_I'.$$

A carry look ahead adder circuit normally produces a propagate signal $P_I$ before a generate signal $G_I$, thus group generate functions and arrival times of generate signals $G_I$ and $G_{I+1}$ are scrutinized.

To produce group generate signals as quickly as possible, when a generate signal $G_I/G_I'$ arrives earlier than a generate signal $G_{I+1}/G_{I+1}'$, a complex AOI/OAI gate is preferably used to perform the group generate logic function. On the other hand, when the generate signal $G_{I+1}/G_{I+1}'$ arrives earlier than the generate signal $G_I/G_I'$, a cascaded pair of 2-input NAND/NOR gates is preferably used to perform the group generate logic function. The propagate signal $P_I/P_I'$ and the earlier arriving generate signal $G_{I+1}/G_{I+1}'$ are preferably provided to the two inputs of a first of the NAND/NOR gates, and the later arriving generate signal $G_I/G_I'$ is preferably provided to one input of the second NAND/NOR gate.

For example, in FIG. 3, a NAND-NAND gate combination 304 performs the logical function:

$$g4063 = ((g56c \text{ NAND } p4055) \text{ NAND } g4055n)$$

A timing analysis revealed the generate signal g56c ($G_{I+1}$) arrived earlier than the generate signal g4055n ($G_I'$). In accordance with the above gate selection process, the NAND-NAND gate combination 304 was selected over a logically equivalent AOI gate. The propagate signal p4055 ($P_I$) and the earlier arriving generate signal g56c ($G_{I+1}$) are provided to the two inputs of a first NAND gate of the NAND-NAND gate combination 304, and the later arriving generate signal g4055n ($G_I'$) is provided to one input of the second NAND gate of the NAND-NAND gate combination 304. It is noted that the resulting generate signal g4063 is the hot carry signal C40 formed over bits <40:63> of the addend and the augend.

A NOR-NOR gate combination 306 in FIG. 3 performs the logical function:

$$g4063n = ((g56cn \text{ NOR } p4055n) \text{ NOR } g4055)$$

A timing analysis revealed the generate signal g56cn ($G_{I+1}'$) arrived earlier than the generate signal g4055 ($G_I$). In accordance with the above gate selection process, the NOR-NOR gate combination 306 was selected over a logically equivalent OAI gate. The propagate signal p4055n ($P_I'$) and the earlier arriving generate signal g56cn ($G_{I+1}'$) are provided to the two inputs of a first NOR gate of the NOR-NOR gate combination 306, and the later arriving generate signal g4055 ($G_I$) is provided to one input of the second NOR gate of the NOR-NOR gate combination 306. It is noted that the resulting inverted generate signal g4063n is the hot carry signal C40N, the complement of the hot carry signal C40 produced by the NAND-NAND gate combination 304.

Similarly, a NAND-NAND gate combination 308 in FIG. 3 was selected as the carry in signal cin arrives earlier than the generate signal g5663n, and a NOR-NOR gate combination 310 was selected as the signal cinn (cin') arrives earlier than the generate signal g5663.

An AOI gate 312 in FIG. 3 performs the logical function:

$$c8n = ((g4063 \text{ AND } p839) \text{ OR } g839)$$

A timing analysis revealed the generate signal g839 ($G_I$) arrived earlier than the generate signal g4063 ($G_{I+1}$). In accordance with the above gate selection process, the AOI gate 312 was selected over a logically equivalent NAND-NAND gate combination.

The generation and distribution of complementary hot carry signals, combined with the careful selection of AOI/OAI gates and NAND/NOR gate combinations along the critical path of the carry logic of FIG. 3, resulted in a 10% reduction in the amount of time required to produce the 64-bit sum and carry out signal (CO in FIG. 3). At the same time, a maximum gate size in the carry logic was reduced by 50%, while a total area required to implement the adder circuit 100 remained substantially the same.

It is noted that in the interest of structural regularity, all of the 8-bit adder circuits of the adder circuit 100 may be made substantially identical. That is, all of the 8-bit adder circuits of the adder circuit 100 may be produced with similar feature sizes (i.e., device sizes). However, additional reductions in the amount of time required to produce the 64-bit sum and carry out signal are possible when devices in each of the 8-bit adder circuits are selectively sized.

Figure 4:
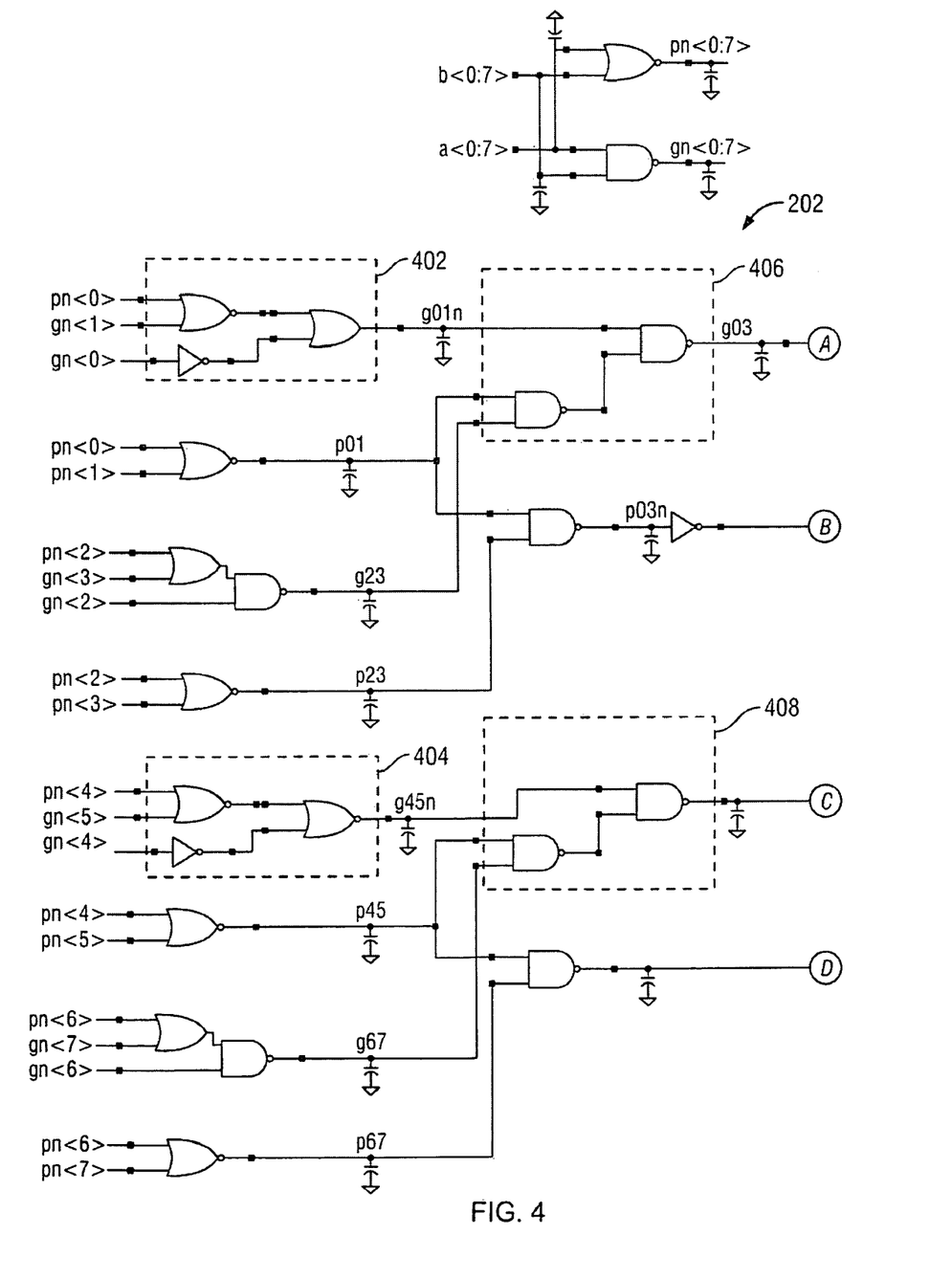
FIG. 4 is a diagram of one embodiment of the CLA logic of FIG. 2.

FIG. 4 is a diagram of one embodiment of the CLA logic 202 of FIG. 2. Group generate and propagate logic functions are also performed in the CLA logic unit 202, and the above gate replacement approach has also been applied to the CLA logic unit 202 of FIG. 4.

For example, a NOR-NOR gate combination 402 in FIG. 4 performs the logical function:

$$g01n = ((gn<1> \text{ NOR } pn<0>) \text{ NOR } g<0>)$$

A timing analysis revealed the generate signal gn<1> ($G_{I+1}'$) arrived earlier than the generate signal g<0> ($G_I$). In accordance with the above gate selection process, the NOR-NOR gate combination 402 was selected over an OAI gate. The propagate signal pn<0> ($P_I'$) and the earlier arriving generate signal gn<1> ($G_{I+1}'$) are provided to the two inputs of a first NOR gate of the NOR-NOR gate combination 402, and the later arriving generate signal g<0> ($G_I$) is provided to one input of the second NOR gate of the NOR-NOR gate combination 402.

Similarly, a NOR-NOR gate combination 404 in FIG. 4 was selected over a logically equivalent OAI gate for the reasons described above, and NAND-NAND gate combinations 406, 408, and 410 were selected over logically equivalent AOI gates during the gate selection process.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A binary adder circuit, comprising:
a carry logic circuit configured to receive a plurality of first group generate signals, an associated plurality of second group generate signals, and a plurality of group propagate signals and configured to produce a plurality of pairs of associated complementary carry signals in response to the first group generate signal, the associated second group generate signal, and the group propagate signal;
wherein the carry logic circuit comprises a plurality of gate combinations, wherein each of the plurality of gate combinations is configured to generate one of the plurality of pairs of associated complementary carry signals in response to one of the plurality of first group generate signals, one of the associated plurality of second group generate signals, and one of the plurality of group propagate signals;
wherein each of the plurality of gate combinations is further configured as either a first gate combination or a second gate combination;
wherein the first gate combination comprises a complex NAND/NOR gate combination;
wherein the second gate combination comprises a complex AND-OR-INVERT (AOI)/OR-AND-INVERT (OAI) gate combination; and
wherein the carry logic circuit further comprises at least one first gate combination and at least one second gate combination; and
a first selection logic coupled to the carry logic circuit and configured to receive a first presum, a second presum, and a first pair of complementary carry signals, and configured to select either the first presum or the second presum as a summation, in response to the first pair of complementary carry signals;
a carry look ahead (CLA) adder circuit coupled to the carry logic circuit and configured to receive a portion of an addend and a corresponding portion of an augend, and configured to produce one of the plurality of first group generate signals, one of the associated second group generate signals, and one of the group propagate signals; and
wherein the portion of the addend and the portion of the augend comprise a plurality of ordered pairs of bits, and wherein the CLA adder circuit is configured to produce a local generate signal and a local propagate signal for each of the ordered pairs of bits, and wherein the group propagate signal is a product of the local propagate signals, and wherein the one of the plurality of first group generate signals and the one of the associated second group generate signals is a sum of products of the local generate and propagate signals.

2. The binary adder circuit as recited in claim 1, wherein the plurality of gate combinations are positioned along a critical timing path of the binary adder circuit.

3. The binary adder circuit as recited in claim 1, wherein the first gate combination further comprises a cascaded pair of NAND gates driving one of a pair of signal lines used to convey the complementary carry signals, and a cascaded pair of NOR gates driving the other of the pair of signal lines used to convey the complementary carry signals.

4. The binary adder circuit as recited in claim 1, further comprising a pair of carry look ahead (CLA) adder circuits coupled to the first selection logic, wherein one of the pair of CLA adder circuits is configured to produce the first presum and the other of the pair of CLA adder circuits is configured to produce the second presum.

5. The binary adder circuit as recited in claim 1, wherein the second gate combination further comprises an AOI driving one of a pair of signal lines used to convey the complementary carry signals, and an OAI driving the other of the pair of signal lines used to convey the complementary carry signals.

6. The binary adder circuit as recited in claim 1, wherein a first group generate signal is configured to arrive at the first gate combination before its associated second group generate signal.

7. The binary adder circuit as recited in claim 6, wherein a first group generate signal is configured to arrive at the second gate combination after its associated second group generate signal.

8. The binary adder circuit as recited in claim 1, wherein:
each of the plurality of first group generate signals is a function of $G_I$;
each of the plurality of associated second group generate signals is a function of $G_{I+1}$; and
each of the plurality of group propagate signal is a function of $P_I$.

9. A binary adder circuit, comprising:
a first carry look ahead (CLA) adder circuit coupled to receive a first portion of an addend and a corresponding first portion of an augend, and configured to produce a first group generate signal of a plurality of first group generate signals, an associated second group generate signal of a plurality of associated second group generate signals, and a group propagate signal of a plurality of group propagate signals;
a second CLA adder circuit and a third CLA adder circuit each coupled to receive a second portion of the addend and a corresponding second portion of the augend, wherein the second CLA adder circuit is configured to produce a first presum and the third CLA adder circuit is configured to produce a second presum;
a carry logic circuit coupled to receive the plurality of first group generate signals, the plurality of associated second group generate signals, and the plurality of group propagate signals and configured to produce a plurality of pairs of complementary carry signals dependent upon the first group generate signal, the associated second group generate signal, and the group propagate signal;
wherein the carry logic circuit comprises a plurality of gate combinations, wherein each of the plurality of gate combinations is configured to generate one of the plurality of pairs of associated complementary carry signals in response to one of the plurality of first group generate signals, one of the associated plurality of second group generate signals, and one of the plurality of group propagate signals;
wherein each of the plurality of gate combinations is further configured as either a first gate combination or a second gate combination;
wherein the first gate combination comprises a complex NAND/NOR gate combination;
wherein the second gate combination comprises a complex AND-OR-INVERT (AOI)/OR-AND-INVERT (OAI) gate combination; and
wherein the carry logic circuit further comprises at least one first gate combination and at least one second gate combination; and
a multiplexer coupled to receive a first presum, a second presum, and a pair of complementary carry signals, and configured to select either the first presum or the second presum dependent upon the received pair of complementary carry signals; and wherein the portion of the addend and the portion of the augend comprise a plurality of ordered pairs of bits, and wherein the CLA adder circuit is configured to produce a local generate signal and a local propagate signal for each of the ordered pairs of bits, and wherein the group propagate signal is a product of the local propagate signals, and wherein the one of the plurality of first group generate signals and the one of the associated second group generate signals is a sum of products of the local generate and propagate signals.

10. The binary adder circuit as recited in claim 9, wherein the plurality of gate combinations are positioned along a critical timing path of the binary adder circuit.

11. The binary adder circuit as recited in claim 9, wherein the first gate combination comprises a cascaded pair of NAND gates driving one of a pair of signal lines used to convey the complementary carry signals, and a cascaded pair of NOR gates driving the other of the pair of signal lines used to convey the complementary carry signals.

12. The binary adder circuit as recited in claim 9, wherein the second gate combination further comprises an AOI driving one of a pair of signal lines used to convey the complementary carry signals, and an OAI driving the other of the pair of signal lines used to convey the complementary carry signals.

13. The binary adder circuit as recited in claim 9, wherein a first group generate signal is configured to arrive at the first gate combination before its associated second group generate signal.

14. The binary adder circuit as recited in claim 13, wherein a first group generate signal is configured to arrive at the second gate combination after its associated second group generate signal.

15. The binary adder circuit as recited in claim 9, wherein:

each of the plurality of first group generate signals is a function of $G_I$;

each of the plurality of associated second group generate signals is a function of $G_{I+1}$; and each of the plurality of group propagate signal is a function of $P_I$.

* * * * *